US012585021B2

(12) United States Patent
Zhu et al.

(10) Patent No.: US 12,585,021 B2
(45) Date of Patent: Mar. 24, 2026

(54) ADDRESSABLE PROJECTOR FOR DOT BASED DIRECT TIME OF FLIGHT DEPTH SENSING

(71) Applicant: Meta Platforms Technologies, LLC, Menlo Park, CA (US)

(72) Inventors: Zhaoming Zhu, Redmond, WA (US); Michael Hall, Bellevue, WA (US); Augusto Ronchini Ximenes, Seattle, WA (US); Shuochen Su, Bellevue, WA (US); Charles Patrick Saunders, Seattle, WA (US); Gregory Cohoon, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 980 days.

(21) Appl. No.: 17/748,777

(22) Filed: May 19, 2022

(65) Prior Publication Data

US 2023/0280468 A1 Sep. 7, 2023

Related U.S. Application Data

(60) Provisional application No. 63/315,221, filed on Mar. 1, 2022.

(51) Int. Cl.
*G01S 17/894* (2020.01)
*G01B 11/22* (2006.01)
(Continued)

(52) U.S. Cl.
CPC ............ *G01S 17/894* (2020.01); *G01B 11/22* (2013.01); *G01S 7/4815* (2013.01); *G01S 7/4865* (2013.01);
(Continued)

(58) Field of Classification Search
None
See application file for complete search history.

(56) References Cited

U.S. PATENT DOCUMENTS 8,009,358 B2    8/2011  Zalevsky et al.
9,268,012 B2    2/2016  Ghosh et al.
(Continued)

FOREIGN PATENT DOCUMENTS

WO        2015016798 A2      2/2015

OTHER PUBLICATIONS

International Search Report and Written Opinion for International Application No. PCT/US2023/014212, mailed Jun. 15, 2023, 8 pages.
(Continued)

*Primary Examiner* — Luke D Ratcliffe
(74) *Attorney, Agent, or Firm* — Freestone Intellectual Property Law PLLC; Aaron J. Visbeek

(57) ABSTRACT

A projector for illuminating a target area is presented. The projector includes an array of emitters having a plurality of subarrays and an optical assembly. Each subarray includes one or more independently addressable channels emitting light in accordance with emission instructions. At least two of the subarrays are adjacent to each other and do not overlap. The optical assembly is configured to tile portions of the emitted light to form a light pattern for projection to a target area. The light pattern has a first plurality of sections and a second plurality of sections. Each section of the first plurality represents a first respective portion of the light pattern emitted from a corresponding subarray. Each section of the second plurality represents a second respective portion of the light pattern formed by tiling light emitted from two or more of the subarrays.

20 Claims, 12 Drawing Sheets

100

(51) Int. Cl.

| | | |
|---|---|---|
| *G01S 7/481* | (2006.01) | |
| *G01S 7/4865* | (2020.01) | |
| *G02B 27/00* | (2006.01) | |
| *G06F 3/01* | (2006.01) | |
| *G06T 7/521* | (2017.01) | |

(52) U.S. Cl.
CPC ......... *G02B 27/0093* (2013.01); *G06F 3/013* (2013.01); *G06T 7/521* (2017.01)

(56) References Cited

U.S. PATENT DOCUMENTS

| | | | |
|---|---|---|---|
| 9,992,474 B2 | 6/2018 | Grunnet-Jepsen et al. | |
| 10,852,817 B1 | 12/2020 | Ouderkirk et al. | |
| 10,958,893 B2 | 3/2021 | Wang et al. | |
| 2017/0115497 A1* | 4/2017 | Chen .................... | H04N 13/207 |
| 2017/0307736 A1* | 10/2017 | Donovan ............... | G01S 17/10 |
| 2019/0033429 A1* | 1/2019 | Donovan ............. | G01S 7/4815 |
| 2020/0073531 A1* | 3/2020 | Romano ................ | G01B 11/25 |
| 2020/0150408 A1* | 5/2020 | Fard ....................... | H04N 23/21 |
| 2020/0217931 A1 | 7/2020 | Lawrenson et al. | |

OTHER PUBLICATIONS

International Preliminary Report on Patentability for International Application No. PCT/US2023/014212, mailed Sep. 12, 2024, 7 pages.

* cited by examiner

Frame 105

Headset Controller 125

Imaging Device 115

Projector 120

Imaging Device 115

Display Element 110

Position Sensor 130

100

300

Tiled Illumination
410

| A' | A' | A' |
| A'+B' | A'+B' | A'+B' |
| A'+B' | A'+B' | A'+B' |
| B' | B' | B' |

Tiling

Addressing
Projector Layout
405

| A |
| B |

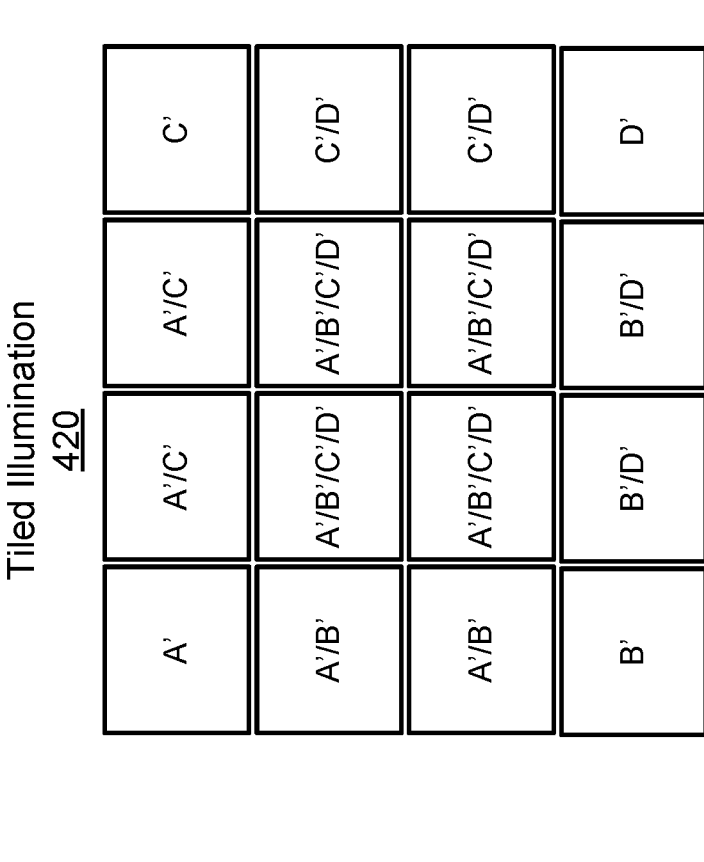
Tiled Illumination 420
Tiling
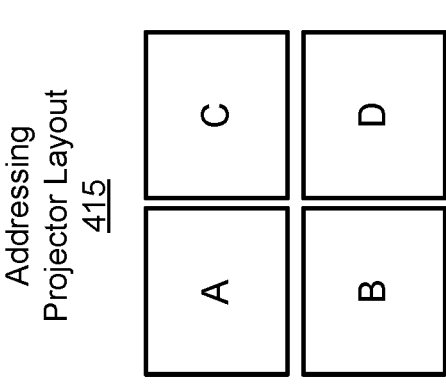
Addressing Projector Layout 415
FIG. 4B Projection Pattern
530

Emitter Array
Addressing Layout
525

525B

525A

525C

525D

600

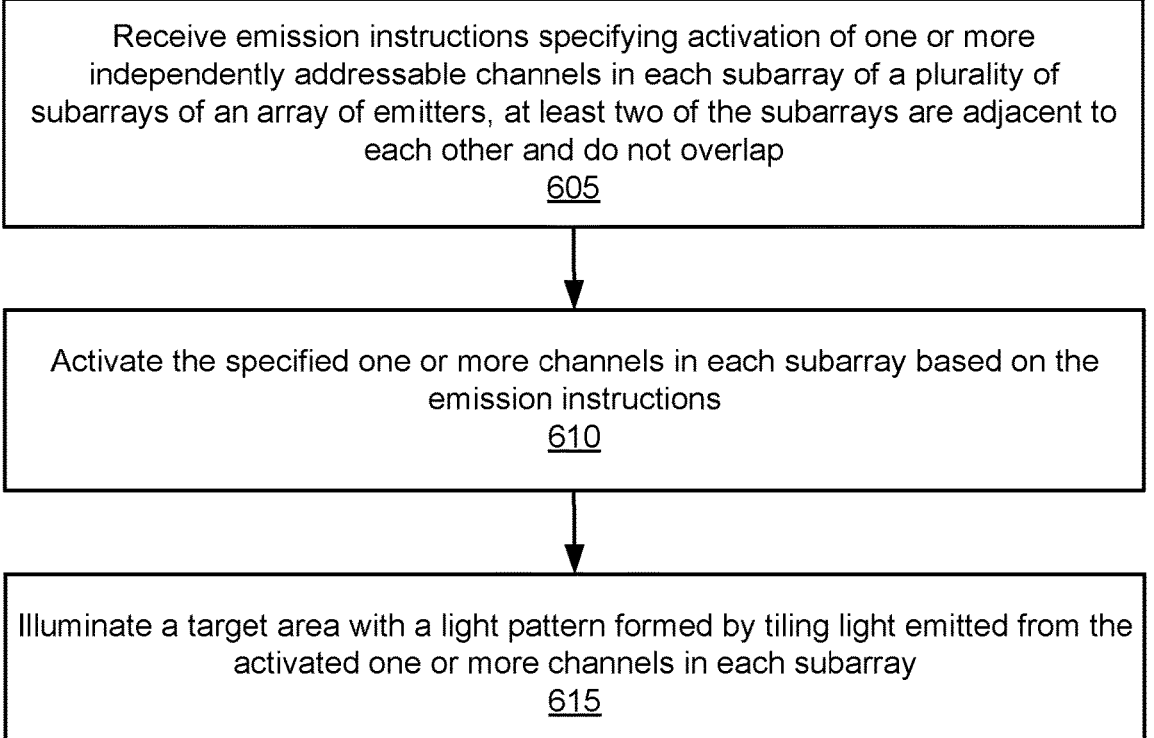

Receive emission instructions specifying activation of one or more
independently addressable channels in each subarray of a plurality of
subarrays of an array of emitters, at least two of the subarrays are adjacent to
each other and do not overlap
605

Activate the specified one or more channels in each subarray based on the
emission instructions
610

Illuminate a target area with a light pattern formed by tiling light emitted from the
activated one or more channels in each subarray
615

ADDRESSABLE PROJECTOR FOR DOT BASED DIRECT TIME OF FLIGHT DEPTH SENSING

CROSS-REFERENCE TO RELATED APPLICATIONS

This application claims benefit of U.S. Provisional Patent Application Ser. No. 63/315,221 filed Mar. 1, 2022, which is hereby incorporated by reference in its entirety.

TECHNICAL FIELD

The present disclosure generally relates to depth sensing, and specifically relates to an addressable projector for dot based direct time-of-flight depth sensing.

BACKGROUND

To achieve simple calibration and robust transmission/ reception alignment for the solid state dot array illumination and direct time-of-flight (dToF) based depth sensing, it is critical to maintain the alignment of projected dots and their corresponding groups of pixels (i.e., unit cells) at a detector to ensure that a detected depth is matched to its corresponding dot (beam) within a defined work range. However, due to a specific baseline between a transmitter (i.e., projector or illuminator) and a receiver (i.e., detector) and various tolerances in constituent components of the transmitter and the receiver, substantial shift of an emitted dot with respect to its targeted unit cell typically occurs within the defined working range. This leads to cross-talk and ambiguity in depth reconstruction between neighboring unit cells at the detector.

There are currently several approaches for addressing the cross-talk and ambiguity in depth reconstruction. One approach is to reduce projection dot density aggressively to meet the specific transmitter/receiver alignment requirement. However, the sparse dot pattern impacts depth densification performance. Another approach is to use active alignment of the constituent components in the transmitter and receiver. However, the depth sensing performance are typically limited by the design of these constituent components. Yet another approach is to reduce a transmitter/ receiver baseline. However, it is typically very challenging to reduce the baseline because of possible achievable sizes of the transmitter and receiver. Yet another approach is to tighten tolerances in the transmitter and/or the receiver to achieve less variance in optical alignment. However, this may lead to low yield in mass production and therefore high cost of depth sensing devices. Yet another approach is to reduce a projection dot size and reduce a dot blurring due to a reception lens (e.g., diffraction limited lens). However, this approach is typically less effective when used in isolation from other projection schemes.

SUMMARY

A projector for illuminating a target area is presented herein that mitigates cross-talk and ambiguity in depth reconstruction. The projector includes an array of emitters having a plurality of subarrays and an optical assembly. Each subarray includes one or more independently addressable channels emitting light in accordance with emission instructions. At least two of the subarrays are adjacent to each other and do not overlap. The optical assembly is configured to tile portions of the emitted light to form a light pattern for projection to a target area. The light pattern has a first plurality of sections and a second plurality of sections, each section of the first plurality representing a first respective portion of the light pattern emitted from a corresponding subarray, and each section of the second plurality representing a second respective portion of the light pattern formed by tiling light emitted from two or more of the subarrays. In some embodiments, the projector is part of a depth camera assembly configured to determine depth information associated with one or more objects in the target area, e.g., in a local area surrounding the projector. In some other embodiments, the projector is part of an eye tracker that determines information about gaze direction for an eye.

In some embodiments, a headset includes the projector. The headset further includes a display and an optical assembly. The headset may be part of an artificial reality system. The display is configured to emit image light. The optical assembly is configured to direct the image light to an eye-box of the headset corresponding to a location of a user's eye. The image light may comprise the depth information of the one or more objects in the local area determined by the headset. In one embodiment, the headset is implemented as an eyeglass-type platform representing a near-eye display. In another embodiment, the headset is implemented as a head-mounted display.

BRIEF DESCRIPTION OF THE DRAWINGS

FIG. 4B illustrates another example addressing projector layout and a corresponding tiled illumination, in accordance with one or more embodiments.

FIG. 6 is a flow chart illustrating a process of illuminating a target area with a light pattern emitted by an array of emitters, in accordance with one or more embodiments.

Figure 1A:
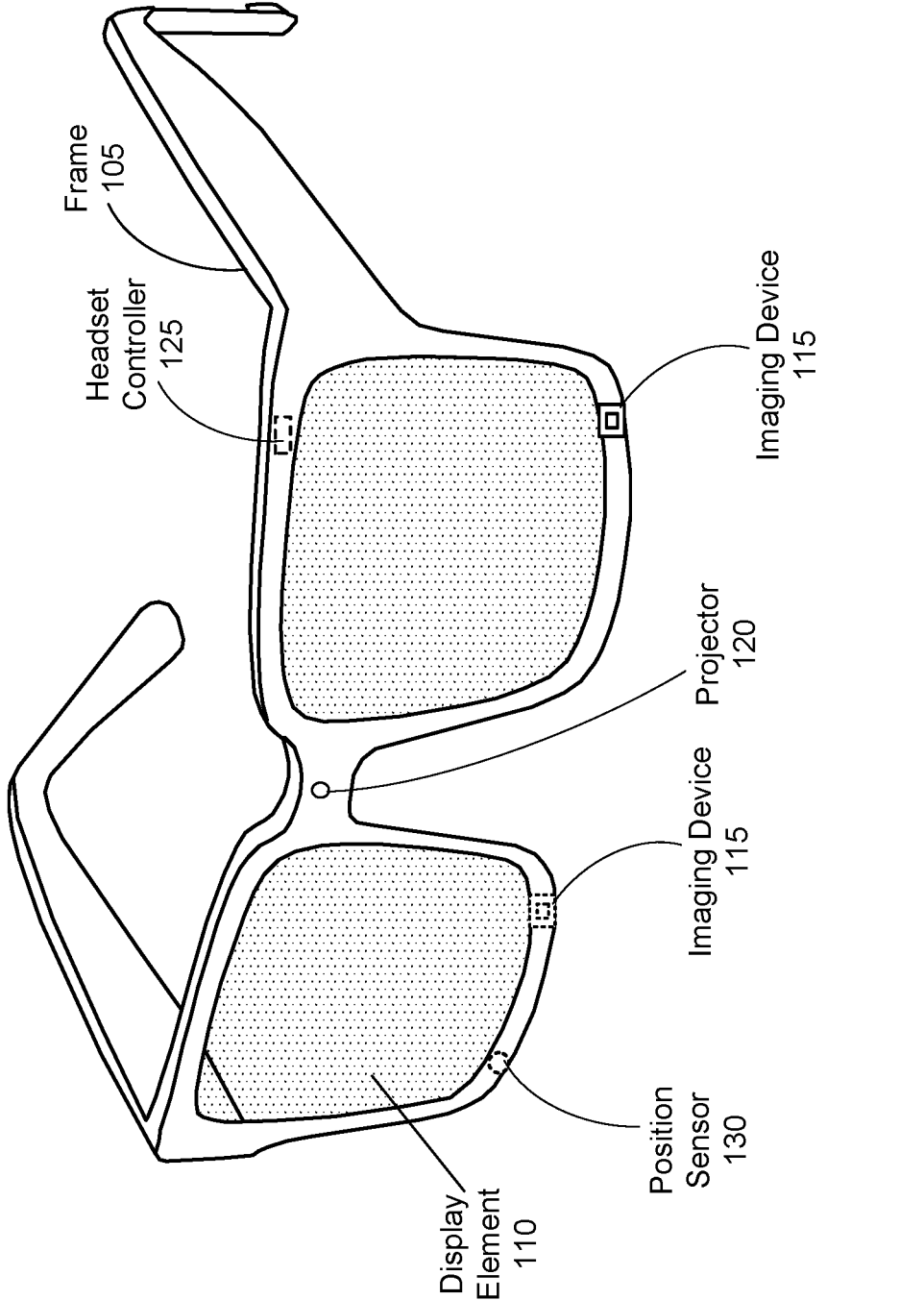
FIG. 1A is a perspective view of a headset implemented as a near-eye-display (NED), in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Addressable dot projectors are among those projectors that make use of the addressable near infra-red (NIR) vertical cavity surface emitting laser (VCSEL) array technology that is superior to the edge-emitting laser diodes. Addressable VCSEL dot emitters can be used in combination with one or more optical elements (e.g., a diffractive beam splitting optical element) to increase the number of dots in the projection.

Embodiments of the present disclosure relate to a structure and operation of an addressable projector that enables high performance dot-based direct time-of-flight (dToF) depth sensing. The addressable projector presented herein has a flexible configurability, higher tolerance for a misalignment between different components of a depth sensing apparatus (e.g., between the projector and the detector), lower beam divergence, etc. Furthermore, the addressable projector presented herein has a small form factor.

The addressable projector presented herein may be part of a system for, e.g., dot-based dToF depth sensing. A proper alignment between a transmitter (i.e., the addressable projector) and a receiver (i.e., the detector) of the depth sensing system can be achieved through time multiplexing of sparse light patterns with a simple emitter array addressing and pattern tiling. By time multiplexing the addressable tiled patterns, a denser depth point cloud can be effectively obtained while each addressable tiled pattern achieves a robust alignment to its corresponding unit cells at the detector, with the advantage of reduced (or, in some embodiments, eliminated) detection cross-talk and/or ambiguity between neighboring unit cells at the detector.

The addressable projector presented herein includes an array of emitters (e.g., VCSEL array) and an optical assembly. The array of emitters features a simple addressing and provides an increased projection dot density while adapting to a field-dependent allowable dot density (e.g., as much dense as possible at a center of a field-of-view (FOV) and sparser toward edges/corners of the FOV). The array of emitters includes a plurality of subarrays that are adjacent to each other, and each subarray includes one or more independently addressable channels. The optical assembly is configured to tile light from the plurality of subarrays to form a dot pattern, of a plurality of dot patterns, in a local area of the projector. The dot pattern has a dot density higher in a center of the dot pattern than at a periphery of the dot pattern. The dot pattern is determined in part by which of the one or more channels are active in each of the plurality of subarrays.

In some embodiments, the addressable projector is part of a depth camera assembly (DCA) that determines depth information for one or more objects in a target area (e.g., a portion of the local area surrounding the DCA) based on light reflected from the one or more objects, the light being emitted from the addressable projector. In some other embodiments, the addressable projector is part of an eye tracker configured to determine a gaze direction for an eye based on light reflected from at least one surface of the eye, the light being emitted from the addressable projector.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset, a head-mounted display (HMD) connected to a host computer system, a standalone HMD, a near-eye display (NED), a mobile device or computing system, or any other hardware platform capable of providing artificial reality content to one or more viewers.

In some embodiments, a headset can integrate the projector as part of the DCA. Alternatively or additionally, the headset may integrate the projector as part of the eye tracker. The headset further includes a display and an optical assembly. The headset may be part of an artificial reality system. The display is configured to emit image light. The optical assembly is configured to direct the image light to an eye-box of the headset corresponding to a location of a user's eye. The image light may comprise the depth information of the one or more objects in the local area determined by the headset. In one embodiment, the headset is implemented as an eyeglass-type platform representing a NED. In another embodiment, the headset is implemented as a HMD.

FIG. 1A is a perspective view of a headset 100 implemented as a NED, in accordance with one or more embodiments. In general, the headset 100 may be worn on the face of a user such that content (e.g., media content) is presented using one or display elements 110 of the headset 100. However, the headset 100 may also be used such that media content is presented to a user in a different manner. Examples of media content presented by the headset 100 include one or more images, video, audio, or some combination thereof. The headset 100 may include, among other components, a frame 105, a display assembly including one or more display elements 110, a DCA, a headset controller 125 and a position sensor 130. While FIG. 1A illustrates the components of the headset 100 in example locations on the headset 100, the components may be located elsewhere on the headset 100, on a peripheral device paired with the headset 100, or some combination thereof.

The headset 100 may correct or enhance the vision of a user, protect the eye of a user, or provide images to a user. The headset 100 may be a NED that produces artificial reality content for the user. The headset 100 may be eyeglasses which correct for defects in a user's eyesight. The headset 100 may be sunglasses which protect a user's eye from the sun. The headset 100 may be safety glasses which protect a user's eye from impact. The headset 100 may be a night vision device or infrared goggles to enhance a user's vision at night.

The frame 105 holds the other components of the headset 100. The headset 100 includes a front part that holds the one or more display elements 110 and end pieces to attach to a head of the user. The front part of the frame 105 bridges the top of a nose of the user. The end pieces (e.g., temples) are portions of the frame 105 to which the temples of a user are attached. The length of the end piece may be adjustable (e.g., adjustable temple length) to fit different users. The end piece may also include a portion that curls behind the ear of the user (e.g., temple tip, ear piece).

The one or more display elements 110 provide light to a user wearing the headset 100. As illustrated, the headset 100 includes a display element 110 for each eye of a user. In some embodiments, a display element 110 generates image light that is provided to an eye box of the headset 100. The eye box is a location in space that an eye of user occupies while wearing the headset 100. For example, a display element 110 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eye box of the headset 100. In-coupling and/or outcoupling of light from the one or more wave- guides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 110 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alterna- tively, in some embodiments, one or both of the display elements 110 are at least partially transparent, such that light from the local area may be combined with light from the one or more display elements to produce AR and/or MR content.

In some embodiments, a display element 110 does not generate image light, and instead is a lens that transmits light from the local area to the eye box. For example, one or both of the display elements 110 may be a lens without correction (non-prescription) or a prescription lens (e.g., single vision, bifocal and trifocal, or progressive) to help correct for defects in a user's eyesight. In some embodiments, the display element 110 may be polarized and/or tinted to protect the user's eyes from the sun.

Note that in some embodiments, the display element 110 may include an additional optics block (not shown). The optics block may include one or more optical elements (e.g., lens, Fresnel lens, etc.) that direct light from the display element 110 to the eye box. The optics block may, e.g., correct for aberrations in some or all of the image content, magnify some or all of the image, or some combination thereof.

The DCA determines depth information for a portion of a local area surrounding the headset 100. The DCA includes one or more imaging devices 115, a projector 120, and a DCA controller (not shown in FIG. 1A). In some embodi- ments, the projector 120 illuminates a portion of the local area with light. The light may be, e.g., structured light (e.g., dot pattern) in the infrared (IR). In some embodiments, the one or more imaging devices 115 capture images of the portion of the local area that include the light from the projector 120. As illustrated, FIG. 1A shows a single pro- jector 120 and two imaging devices 115.

The DCA controller computes depth information for the portion of the local area using the captured images and one or more depth determination techniques. The depth determination technique may be dToF depth sensing. Alterna- tively or additionally, the depth determination technique can be indirect time-of-flight (iToF) depth sensing, structured light depth sensing, passive stereo analysis based depth sensing, active stereo analysis based depth sensing (uses texture added to the scene by light from the projector 120), some other technique to determine depth of a scene, or some combination thereof.

Based on the determined depth information, the DCA controller may determine absolute positional information of the headset 100 within the local area. The DCA controller may also generate a model of the local area. The one or more imaging devices 115 may be integrated with the headset 100 or may be positioned within the local area external to the headset 100. In some embodiments, the DCA controller may provide the depth image data to the headset controller 125 integrated into the headset 100, e.g., for further processing and/or communication to some other component of an artificial reality system that includes the headset 100. The one or more imaging devices 115 may be part of simulta- neous localization and mapping (SLAM) sensors mounted on the headset 100 for capturing visual information of a local area surrounding some or all of the headset 100.

The headset controller 125 may control operations of one or more components of the headset 100 including the projector 120. The headset controller 125 may receive the depth image data from the DCA controller and perform additional processing on the depth image data. In some embodiments, the headset controller 125 may control opera- tions of components of an audio system integrated into the headset 100 (not shown in FIG. 1A). The headset controller 125 may include a communication module (e.g., a trans- ceiver) for data communication (e.g., wireless communica- tion) with some other external component of the artificial reality system, e.g., a server and/or a console (not shown in FIG. 1A).

The position sensor 130 generates one or more measure- ment signals in response to motion of the headset 100. The position sensor 130 may be located on a portion of the frame 105 of the headset 100. The position sensor 130 may include a position sensor, an inertial measurement unit (IMU), or both. Some embodiments of the headset 100 may or may not include the position sensor 130 or may include more than one position sensors 130. In embodiments in which the position sensor 130 includes an IMU, the IMU generates IMU data based on measurement signals from the position sensor 130. Examples of position sensor 130 include: one or more accelerometers, one or more gyroscopes, one or more magnetometers, another suitable type of sensor that detects motion, a type of sensor used for error correction of the IMU, or some combination thereof. The position sensor 130 may be located external to the IMU, internal to the IMU, or some combination thereof.

Based on the one or more measurement signals, the position sensor 130 estimates a current position of the headset 100 relative to an initial position of the headset 100. The estimated position may include a location of the headset 100 and/or an orientation of the headset 100 or the user's head wearing the headset 100, or some combination thereof. The orientation may correspond to a position of each ear relative to a reference point. In some embodiments, the position sensor 130 uses the depth information and/or the absolute positional information from the DCA to estimate the current position of the headset 100. The position sensor 130 may include multiple accelerometers to measure trans- lational motion (forward/back, up/down, left/right) and mul- tiple gyroscopes to measure rotational motion (e.g., pitch, yaw, roll). In some embodiments, an IMU rapidly samples the measurement signals and calculates the estimated position of the headset 100 from the sampled data. For example, the IMU integrates the measurement signals received from the accelerometers over time to estimate a velocity vector and integrates the velocity vector over time to determine an estimated position of a reference point on the headset 100. The reference point is a point that may be used to describe the position of the headset 100. While the reference point may generally be defined as a point in space, however, in practice the reference point is defined as a point within the headset 100.

Figure 1B:
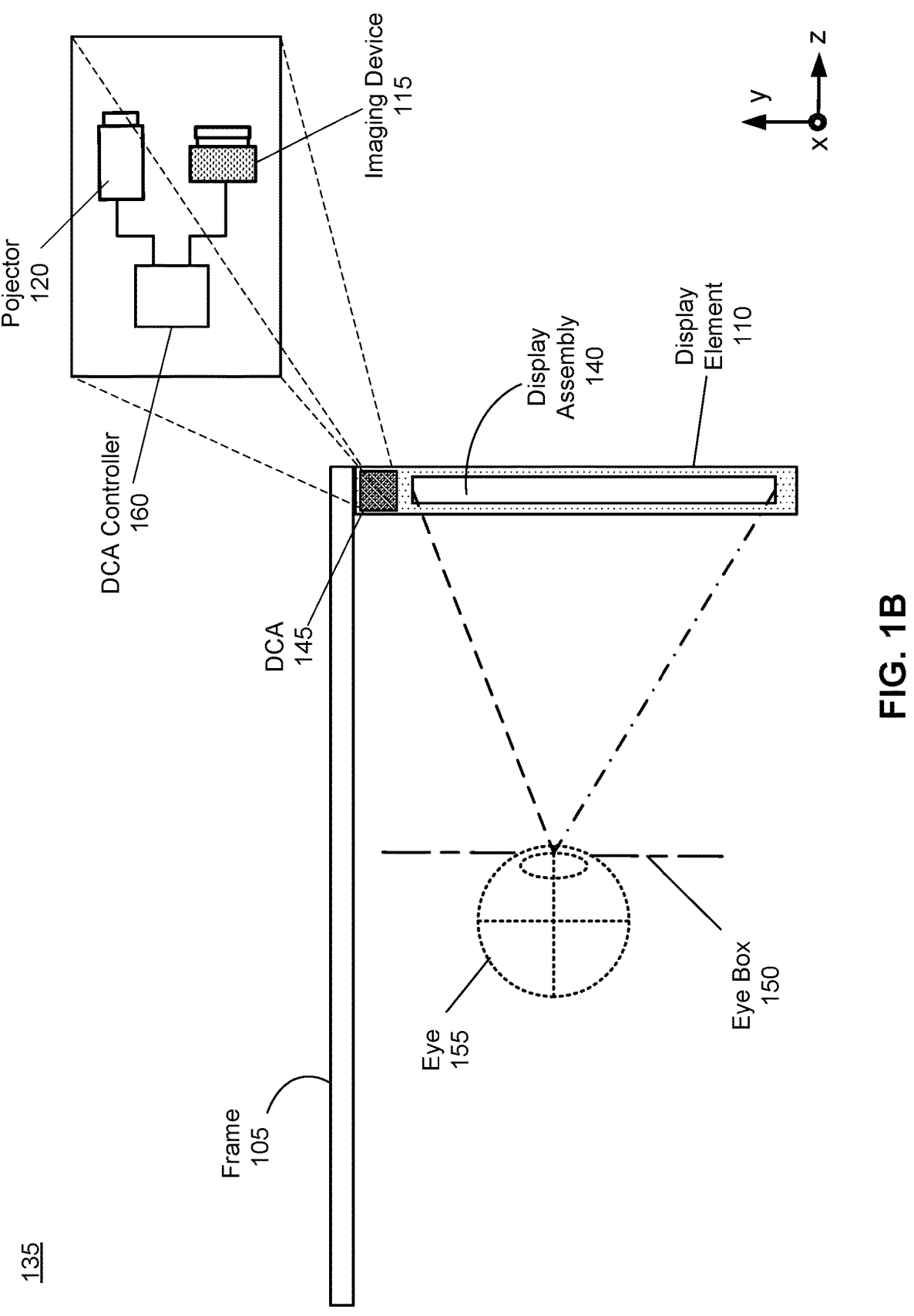
FIG. 1B is a cross-section of an eyewear of the headset in FIG. 1A, in accordance with one or more embodiments.

FIG. 1B is a cross section 135 of an eyewear of the headset 100 illustrated in FIG. 1A, in accordance with one or more embodiments. The cross section 135 may include at least one display assembly 140 integrated into the display element 110, a DCA 145, and an eye box 150. The eye box 150 is a location where an eye 155 is positioned when a user wears the headset 100. In some embodiments, the frame 105 may represent a frame of eye-wear glasses. For purposes of illustration, FIG. 1B shows the cross section 135 associated with a single eye 155 and a single display assembly 140, but in alternative embodiments not shown, another display assembly which is separate from the display assembly 140 shown in FIG. 1B, provides image light to another eye 155 of the user.

The display assembly 140 is configured to direct the image light to the eye 155 through the eye box 150. In some embodiments, when the headset 100 is configured as an AR NED, the display assembly 140 also directs light from a local area surrounding the headset 100 to the eye 155 through the eye box 150. The display assembly 140 may be configured to emit image light at a particular focal distance in accordance with varifocal instructions, e.g., provided from a varifocal module (not shown in FIG. 1).

The display assembly 140 may be composed of one or more materials (e.g., plastic, glass, etc.) with one or more refractive indices that effectively minimize the weight and present to the user a field of view of the headset 100. In alternate configurations, the headset 100 includes one or more optical elements between the display assembly 140 and the eye 155. The optical elements may act to, e.g., correct aberrations in image light emitted from the display assembly 140, magnify image light, perform some other optical adjustment of image light emitted from the display assembly 140, or some combination thereof. The example for optical elements may include an aperture, a Fresnel lens, a convex lens, a concave lens, a liquid crystal lens, a diffractive element, a waveguide, a filter, a polarizer, a diffuser, a fiber taper, one or more reflective surfaces, a polarizing reflective surface, a birefringent element, or any other suitable optical element that affects image light emitted from the display assembly 140.

The frame 105 further includes the DCA 145 configured to determine depth information of one or more objects in a local area surrounding some or all of the headset 100. For purposes of illustration, FIG. 1B shows the cross section 135 associated with a portion of the frame 105 including the DCA 145. However, the DCA 145 may be integrated into another portion of the frame 105. The DCA 145 includes the projector 120, the imaging device 115, and a DCA controller 160 that may be coupled to at least one of the projector 120 and the imaging device 115. In some embodiments (now shown in FIG. 1), the projector 120 and the imaging device 115 each may include its own internal controller. In some embodiments (not shown in FIG. 1i), the projector 120 and the imaging device 115 can be widely separated, e.g., the projector 120 and the imaging device 115 can be located in different assemblies. In some embodiments (not shown in FIG. 1), the DCA 145 includes one or more additional imaging devices 115.

The projector 120 may be configured to illuminate a target area (e.g., at least a portion of the local area) with a light pattern in accordance with emission instructions generated by the DCA controller 160. The projector 120 may include an array of emitters having a plurality of subarrays. Each subarray of the projector 120 may include one or more independently addressable channels emitting light in accordance with the emission instructions, and at least two of the subarrays may be adjacent to each other and may not overlap. In one embodiment, the projector 120 includes two independently addressable subarrays that do not overlap. In another embodiment, the projector 120 includes four independently addressable subarrays that do not overlap. In some other embodiments, the projector 120 includes multiple independently addressable subarrays that at least partially overlap. Examples of addressing projector layouts are shown in FIG. 4A through FIG. 5C. At least the portion of the emitters in the array of the projector 120 emit light in NIR spectrum, e.g., having one or more wavelengths between approximately 780 nm and 2500 nm. Each emitter of the projector 120 may be implemented as a VCSEL emitter that emits in, e.g., the NTR spectrum.

The light emitted from the array of emitters of the projector 120 may be projected into the target area as a light pattern by an optical assembly of the projector 120 (not shown in FIG. 1i). The optical assembly of the projector 120 may include at least one of a diffractive optical element (e.g., a diffractive beam splitting optical element), collimation optics, and one or more projection lenses. The optical assembly of the projector 120 may tile portions of the emitted light to form the light pattern for projection to the target area. The light pattern may be composed of a first plurality of sections and a second plurality of sections. Each section of the first plurality may represent a first respective portion of the light pattern emitted from a corresponding subarray, and each section of the second plurality may represent a second respective portion of the light pattern formed by tiling light emitted from two or more of the subarrays. Examples of the tiled light pattern emitted from the projected 120 are shown in FIG. 4A through FIG. 5C. Additional details about a structure and operation of the projector 120 are disclosed in relation to FIG. 2, FIG. 3, and FIG. 6.

The imaging device 115 includes one or more cameras configured to capture one or more images of at least a portion of the light reflected from one or more objects in the local area. In one embodiment, the imaging device 115 is an infrared camera configured to capture images in a NIR spectrum. Additionally, the imaging device 115 may be also configured to capture images of visible spectrum light. The imaging device 115 may include a charge-coupled device (CCD) detector, a complementary metal-oxide-semiconductor (CMOS) detector, a single-photon avalanche diodes (SPAD) detector, some other types of detector, or combination thereof. The imaging device 115 may be configured to operate with a frame rate in the range of approximately 30 Hz to approximately 1 KHz for fast detection of objects in the local area. In some embodiments, the imaging device 115 is deactivated for a defined amount of time before being activated again. Alternatively or additionally, the imaging device 115 can operate as instructed by the DCA controller 160 for single or multiple frames, up to a maximum frame rate, which can be in the kilohertz range.

The DCA controller 160 may generate the emission instructions and provide the emission instructions to the projector 120 for controlling operation of at least a portion of emitters in the array in the projector 120 to emit light. The DCA controller 160 may control, based on the emission instructions, operation of the projector 120 to dynamically adjust a pattern of the light illuminating the local area, an intensity of the light pattern, a density of the light pattern, location of the light pattern being projected at the target area, combination thereof, etc. The DCA controller 160 may be also configured to determine depth information for the one or more objects in the target area based in part on the one or more images captured by the imaging device 115. In some embodiments, the DCA controller 160 provides the determined depth information to a console (not shown in FIG. 1B) and/or an appropriate module of the headset 100 (e.g., a varifocal module, not shown in FIG. 1). The console and/or the headset 100 may utilize the depth information to, e.g., generate content for presentation on the display assembly 140.

In some embodiments, the headset 100 further includes an eye tracker (not shown in FIG. 1B) for determining and tracking a position of the eye 155, i.e., an angle and orientation of eye-gaze. Note that information about the position of the eye 155 also includes information about an orientation of the eye 155, i.e., information about user's eye-gaze. Based on the determined and tracked position and orientation of the eye 155, the headset 100 adjusts image light emitted from the display assembly 140. In some embodiments, the headset 100 adjusts focus of the image light and ensures that the image light is in focus at the determined angle of eye-gaze in order to mitigate the vergence-accommodation conflict. Additionally or alternatively, the headset 100 adjusts resolution of the image light by performing foveated rendering of the image light, based on the position of the eye 150. Additionally or alternatively, the headset 100 uses the information on a gaze position and orientation to provide contextual awareness for the user's attention, whether on real or virtual content. The eye tracker generally includes an illumination source and an imaging device (camera). In some embodiments, components of the eye tracker are integrated into the display assembly 140. In alternate embodiments, components of the eye tracker are integrated into the frame 105. In some embodiments, the illumination source of the eye tracker has the same structure and operates in the same manner as the projector 120.

Figure 1C:
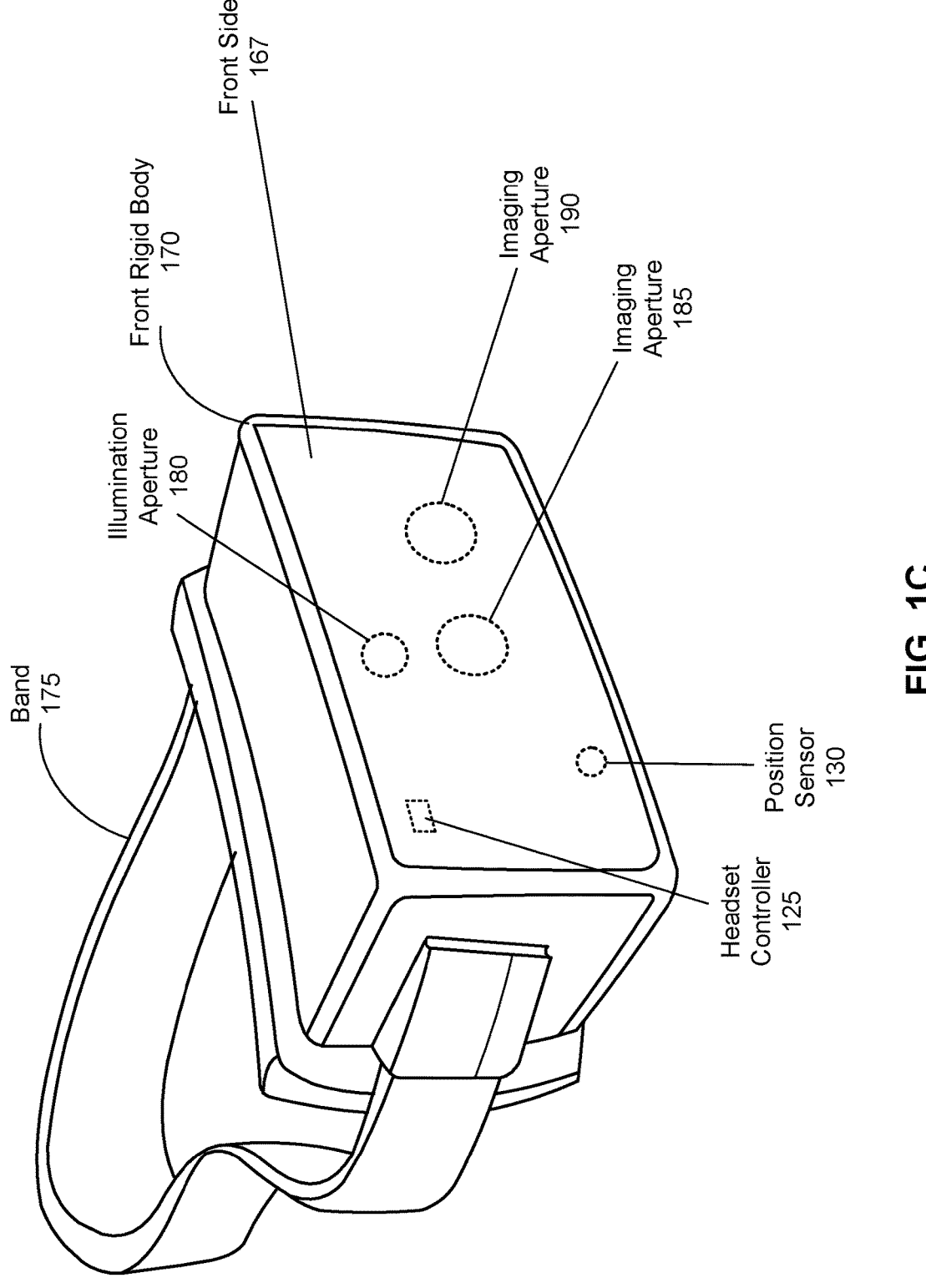
FIG. 1C is a perspective view of a headset implemented as a head-mounted display (HMD), in accordance with one or more embodiments.

FIG. 1C is a perspective view of a headset 165 implemented as a HMD, in accordance with one or more embodiments. In embodiments that describe an AR system and/or a MR system, portions of a front side 167 of the headset 165 are at least partially transparent in the visible band (~380 nm to 750 nm), and portions of the headset 165 that are between the front side 167 and an eye of the user are at least partially transparent (e.g., a partially transparent electronic display). The headset 165 includes a front rigid body 170 and a band 175. The headset 165 includes many of the same components described above with reference to FIG. 1A, but modified to integrate with the HMD form factor. For example, the headset 165 includes a display assembly, a DCA, an audio system, and one or more position sensors 130. The front rigid body 170 includes one or more electronic display elements (not shown in FIG. 1C), one or more integrated eye tracking systems (not shown in FIG. 1C), and the one or more position sensors 130. The position sensors 130 may be located within an IMU, and neither the IMU nor the position sensors 130 are visible to a user of the headset 200.

FIG. 1C further shows an illumination aperture 180 associated with the projector 120, and imaging apertures 185, 190 associated with the imaging devices 115. The projector 120 emits light (e.g., a structured light pattern) through the illumination aperture 180. The one or more imaging devices 115 capture light that is reflected from the target area through at least one of the imaging apertures 185, 190.

Figure 2:
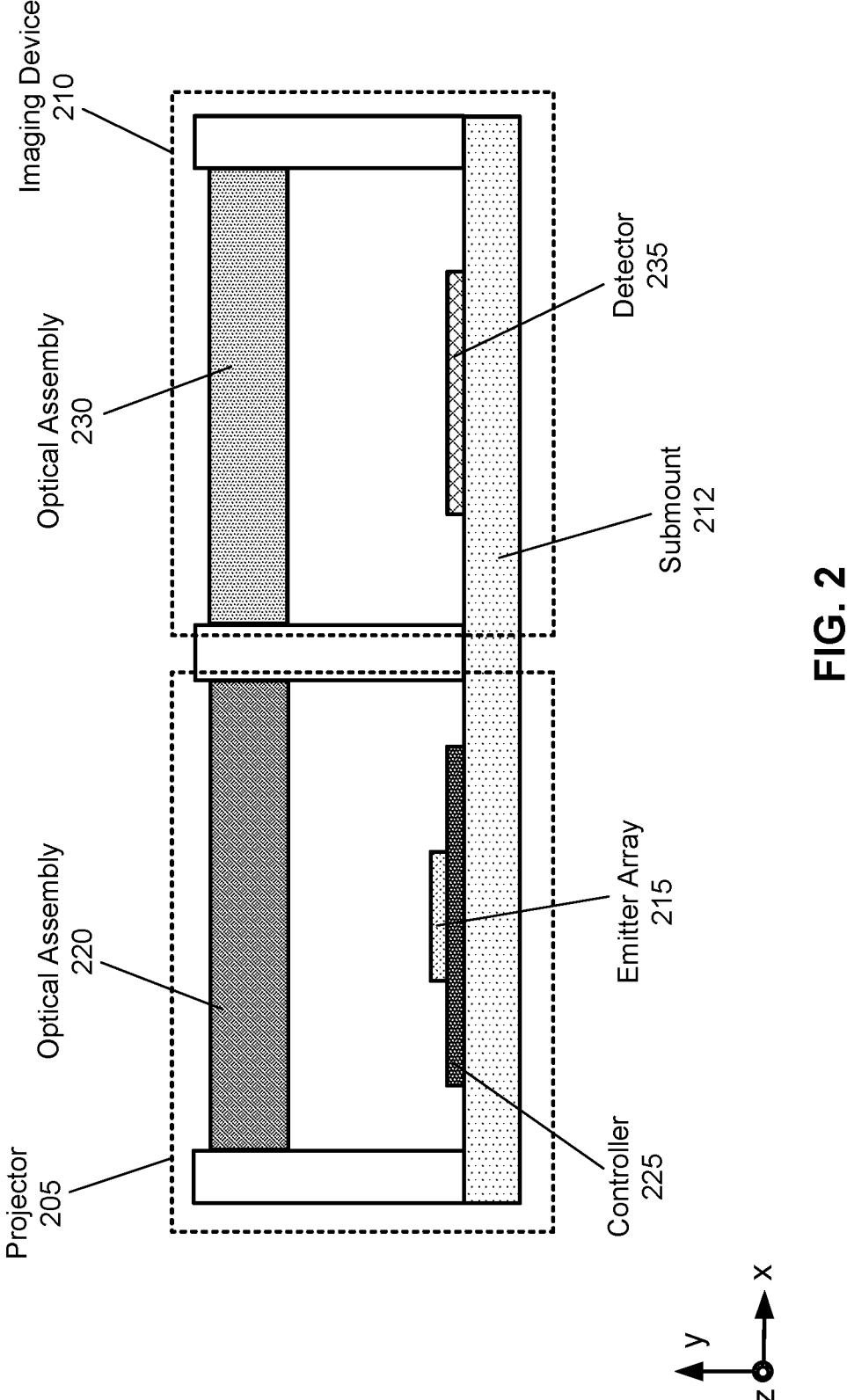
FIG. 2 illustrates an example cross section of a depth camera assembly (DCA), in accordance with one or more embodiments.

FIG. 2 illustrates an example cross section of a DCA 200, in accordance with one or more embodiments. The DCA 200 may be an embodiment of the DCA 145. The DCA 200 may include a projector 205 and an imaging device 210, and the projector 205 and the imaging device 210 can be implemented on a same submount (i.e., a substrate) 212. Alternatively, the projector 205 and the imaging device 210 can be implemented on different submounts. The projector 205 may transmit light, e.g., pulses of light that illuminate a target area (i.e., at least a portion of a local area surrounding the DCA 200). In some embodiments, the transmitted light may include a light pattern, e.g., dot pattern. The projector 205 may include an emitter array 215, an optical assembly 220, and a controller 225. The projector 205 may be an embodiment of the projector 120.

The emitter array 215 may include a VCSEL array, an array of light emission diodes (LEDs), some other type of emitters, or some combination thereof. Each emitter (e.g., each VCSEL) in the emitter array 215 may emit a light beam of, e.g., a circular shape having a specific level of brightness based on emission instructions from the controller 225. The size of emitter array 215 can be appropriately selected in accordance with embodiments illustrated in FIG. 4A through FIG. 5C.

The optical assembly 220 may process at least portions of light emitted from the emitter array 215 to form a light pattern (e.g., dot pattern) for projection to the target area. The optical assembly 220 may include a diffractive optical element (DOE) beam splitter, collimation optics, one or more projection lenses, some other optical element(s), or some combination thereof. The collimation optics of the optical assembly 220 may collimate at least a portion of light beams emitted from the emitter array 215 to form at least a portion of the light pattern for projection to the target area. In some embodiments, the DOE beam splitter of the optical assembly 220 (e.g., in optical series with the collimation optics) may split a light beam emitted from a corresponding emitter in the emitter array 215 to generate multiple light beams. In some other embodiments, the optical assembly 220 provides direct projection of the light emitted from the emitter array 215 using the one or more projection lenses. In such case, a power of each light beam (e.g., of a circular shape) emitted from a respective emitter (e.g., a respective VCSEL) in the emitter array 215 may be determined by the controller 225 that controls operation of the respective emitter. In both cases, the optical assembly 220 may effectively use at least portions of the light emitted from the emitter array 215 to form the light pattern for projection to the target area.

The controller 225 may control operations of the emitter array 215 (e.g., operation of the VCSEL array). The controller 225 may be coupled to each group of emitters (e.g., group of VCSELs) in the emitter array 215 for independently controlling light emission from each group of emitters. The controller 225 may be implemented as a processor implemented on the submount 212 that generates appropriate electrical signals for controlling operations of each group of emitters in the emitter array 215. The controller 225 may be also coupled to a detector 235 of the imaging device 210 for receiving light information reflected from the target area captured by the detector 235. The controller 225 may be an embodiment of the DCA controller 160.

The imaging device 210 may capture portions of the light pattern reflected from one or more objects in the target area. The imaging device 210 may include an optical assembly 230 and the detector 235. The optical assembly 230 may propagate the portions of the reflected light pattern and direct the portions of the reflected light pattern to the detector 235. The optical assembly 230 may include one or more projection lenses. The detector 235 captures light intensities in relation to the portions of the reflected light pattern. The detector 235 may include an array of a single-photon avalanche diodes (SPADs), or some other array of sensing elements capable of capturing multiple light intensities substantially at the same time instant. In some embodiments, each sensing element (e.g., each SPAD) of the detector 235 may capture a light intensity for a respective light beam (e.g., of a circular shape or dot) reflected from a respective portion of the target area. Light signals from the detector 235 (e.g., a photon arrival time in the form of time-to-digital histogram, or some other light information) may be provided to a controller (e.g., a controller of the imaging device 210 or the controller 225) for determination of depth information for the target area based in part on the light information captured at the detector 235.

Figure 3:
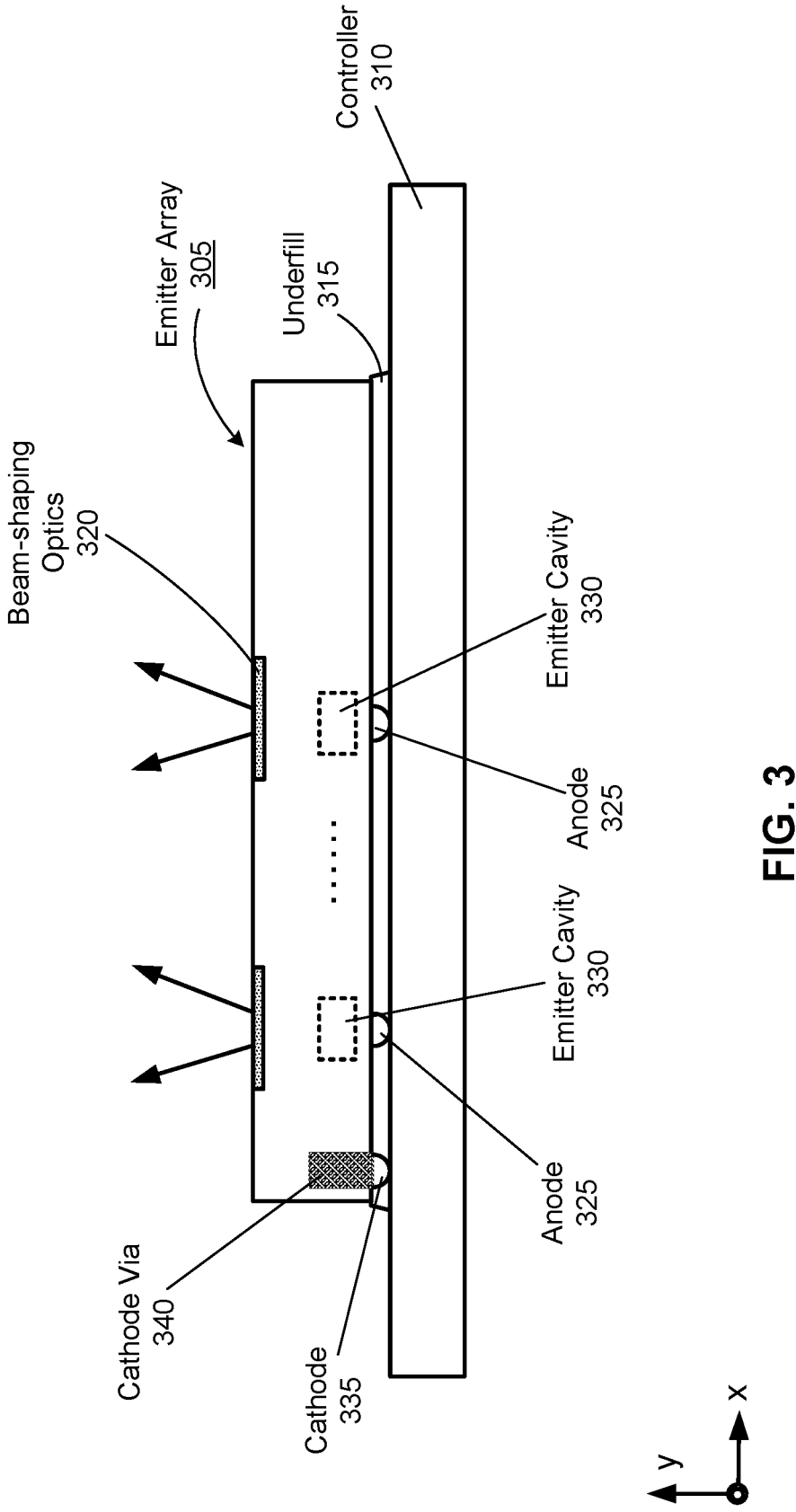
FIG. 3 is a cross section of a projector that includes a vertical cavity surface emitting laser (VCSEL) array of emitters, in accordance with one or more embodiments.

FIG. 3 is a cross section of a projector 300 that includes an array of emitters, in accordance with one or more embodiments. The projector 300 may project light that represent, e.g., dToF direct projection. The projector 300 may include an emitter array 305 and a controller (e.g., driver) 310 with an underfill 315 placed between the emitter array 305 and the controller 310. The emitter array 305 may be an embodiment of the emitter array 215, and the controller 310 may be an embodiment of the controller 225. The emitter array 305 may be a VCSEL array.

Each emitter (e.g., each VCSEL) in the emitter array 305 may include a respective beam-shaping optics 320 (e.g., diffractive optical element or metasurface) that emits a respective light beam of a particular shape (e.g., circular shape). The beam-shaping optics 320 may comprise one or more sub-wavelength optical structures configured to change an amplitude, phase and/or polarization of the incident light. Each VCSEL in the emitter array 305 may further include a respective anode 325 coupled to the beam-shaping optics 320. The anode 325 is an electrode where electricity moves into (e.g., based on a voltage or current signal from the controller 310). The electricity from the anode 325 flows into an emitter cavity 330 where output light is generated, which then undergoes beam shaping when passing through the beam-shaping optics 320. One or more anodes 325 may be coupled to a corresponding cathode 335 connected to the emitter array 305 over a cathode via 340. A desired addressability of the emitter array 305 can be achieved by properly grouping anodes 325, or both anodes 325 and cathodes 335.

Figure 4A:
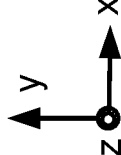
FIG. 4A illustrates an example addressing projector layout and a corresponding tiled illumination, in accordance with one or more embodiments.

FIG. 4A illustrates an example addressing projector layout 405 and a corresponding tiled illumination 410, in accordance with one or more embodiments. The addressing projector layout 405 may correspond to an addressing layout of a projector (e.g., the projector 205 or the projector 300) that includes an emitter array (e.g., a VCSEL array) and an optical assembly (e.g., the optical assembly 220) for generating the tiled illumination 410. The projector having the addressing layout 405 may include two independently addressable subarrays of emitters (e.g., two subarrays of VCSELs)—subarray A and subarray B. The two subarrays A and B can be of the same size (i.e., can have the same number of emitters) or of different sizes (i.e., can have different numbers of emitters). The two subarrays A and B are adjacent to each other and do not overlap. Each subarray A and B may include a corresponding independently addressable channel emitting light (e.g., light beams of a circular shape) in accordance with emission instructions. All emitters of the two subarrays A and B may be placed on the same substrate. By putting the subarrays A and B side by side on the same substrate, the complexity of addressing is substantially reduced relative to the case when the subarrays are interwoven in the emitter array.

The optical assembly of the projector having the addressing layout 405 may tile light from the two subarrays of emitters A and B into the tiled illumination 410, as shown in FIG. 4A. Sections of the tiled illumination 410 labeled as A' (or B') include light emitted from the subarray A (or the subarray B) obtained by, e.g., replicating a pattern emitted from the subarray A (or a pattern emitted from the subarray B). The optical assembly may further form sections of the tiled illumination 410 labeled as A'+B' by tiling light emitted from the subarray A with light emitted from the subarray B. The sections labeled as A'+B' may be obtained by replicating (e.g., by the optical assembly) patterns emitted from the subarrays A and B and overlapping the replicated patterns so that an illumination density of each section A'+B' is twice higher than an illumination density of the sections labeled as A' and B'. Thus, the tiled illumination 410 represents a light pattern with two types of sections. Each section of the first type (e.g., section A' or section B') represents a first respective portion of the light pattern emitted from a single corresponding subarray of emitters, i.e., from the subarray A or the subarray B. Each section of the second type (e.g., section A'+B') represents a second respective portion of the light pattern formed by tiling and overlapping light emitted from the subarray A and the subarray B.

The tiled illumination 410 has an illumination density higher in a center part of a FOV than at a peripheral part of the FOV. This may lead to, e.g., appropriately denser dots in the center part of the FOV and sparser dots towards the peripheral part of the FOV that typically exhibits worst alignment between the projector and a detector (e.g., the detector 235) and has less importance in depth sensing. At the same time, the emitter array (e.g., VCSEL array) of the projector having the addressing layout 405 can be implemented with relatively simple addressing and routing, while having viability for high-speed operations.

The projector having the addressing layout 405 may be utilized along with the detector for time multiplexed pattern projection and detection. In one or more embodiments, two sub-frames of light illumination and data capturing is used to generate one frame of depth sensing data. For example, during a first sub-frame, only the subarray A may be activated so that the projector illuminates a target area with the light pattern A'. During the first sub-frame, the detector may activate a first portion of pixels corresponding to the subarray A and output first depth sensing data. The first subframe may be followed by a second sub-frame during which only the subarray B is activated so that the projector illuminates the target area with the light pattern B'. Reflected portions of the light pattern B' may be detected by a second portion of pixels of the detector corresponding to the subarray B, and the detector may output second depth sensing data. The first and second depth sensing data may be fused/combined (e.g., at the controller 225) to output a single frame of depth sensing data.

FIG. 4B illustrates an example addressing projector layout 415 and a corresponding tiled illumination 420, in accordance with one or more embodiments. The addressing projector layout 415 may correspond to an addressing layout of a projector (e.g., the projector 205 or the projector 300) that includes an emitter array (e.g., a VCSEL array) and an optical assembly (e.g., the optical assembly 220) for generating the tiled illumination 420. The projector having the addressing layout 415 may include four independently addressable subarrays of emitters (e.g., four subarrays of VCSELs)—subarray A, subarray B, subarray C, and subarray D. The four subarrays A, B, C and D are positioned in a quadrant arrangement, i.e., the addressing layout 415 is divided into four quadrants and each quadrant includes emitters that belong to a respective subarray A, B, C and D. The subarrays A, B, C and D can be of the same size (i.e., can have the same number of emitters) or of different sizes (i.e., can have different numbers of emitters). The subarrays A, B, C and D are adjacent to each other and do not overlap. Each subarray A, B, C and D may include a corresponding independently addressable channel emitting light (e.g., light beams of a circular shape) in accordance with emission instructions. All emitters of the four subarrays A, B, C and D may be placed on the same substrate. By putting the subarrays A, B, C and D side by side on the same substrate, the complexity of addressing is substantially reduced relative to the case when the subarrays are interwoven in the emitter array.

The optical assembly of the projector having the addressing layout 415 may tile light from the four subarrays of emitters A, B, C and D into the tiled illumination 420, as shown in FIG. 4B. Sections of the tiled illumination 420 labeled as A' (B', C', or D') include light emitted from the subarray A (the subarray B, the subarray C, or the subarray D) obtained by, e.g., replicating a pattern emitted from the subarray A (a pattern emitted from the subarray B, a pattern emitted from the subarray C, or a pattern emitted from the subarray D). The optical assembly may further form sections of the tiled illumination 420 labeled as A'/B', A'/C', B'/D', C'/D' by tiling light emitted from two corresponding subarrays. The sections labeled as A'/B', A'/C', B'/D', C'/D' may be obtained by replicating (e.g., by the optical assembly) patterns emitted from the two corresponding subarrays and overlapping the replicated patterns so that an illumination density of each section A'/B', A'/C', B'/D', C'/D' is twice higher than an illumination density of the sections labeled as A', B', C' and D'. The optical assembly may further form sections of the tiled illumination 420 labeled as A'/B'/C'/D' by tiling light emitted from all four subarrays A, B, C and D. The sections labeled as A'/B'/C'/D' may be obtained by replicating (e.g., by the optical assembly) patterns emitted from the four subarrays and overlapping the replicated patterns so that an illumination density of each section A'/B'/C'/D' is four times higher than an illumination density of the sections labeled as A', B', C' and D'.

Similarly as for the tiled illumination 410, the tiled illumination 420 represents a light pattern with two types of sections. Each section of the first type (e.g., section A', section B', section C', and section D') represents a first respective portion of the light pattern emitted from a single corresponding subarray of emitters, i.e., from the subarray A, the subarray B, the subarray C, or the subarray D. Each section of the second type (e.g., sections A'/B', A'/C', B'/D', C'/D', A'/B'/C'/D') represents a second respective portion of the light pattern formed by tiling and overlapping light emitted from multiple subarrays (e.g., two or four subarrays).

Again, similarly as for the tiled illumination 410, the tiled illumination 420 has an illumination density higher in a center part of a FOV than at peripheral parts of the FOV. This may lead to, e.g., appropriately denser dots in the center part of the FOV and sparser dots towards the peripheral parts of the FOV that typically exhibits worst alignment between the projector and the detector and has less importance in depth sensing. At the same time, the emitter array (e.g., VCSEL array) of the projector having the addressing layout 415 can be implemented with relatively simple addressing and routing, while having viability for high-speed operations.

Note that tiling examples in FIGS. 4A-4B are for illustrative purposes only, and other tiling implementations are also possible (e.g., as shown below in relation to FIGS. 5A-5C).

Figure 5A:
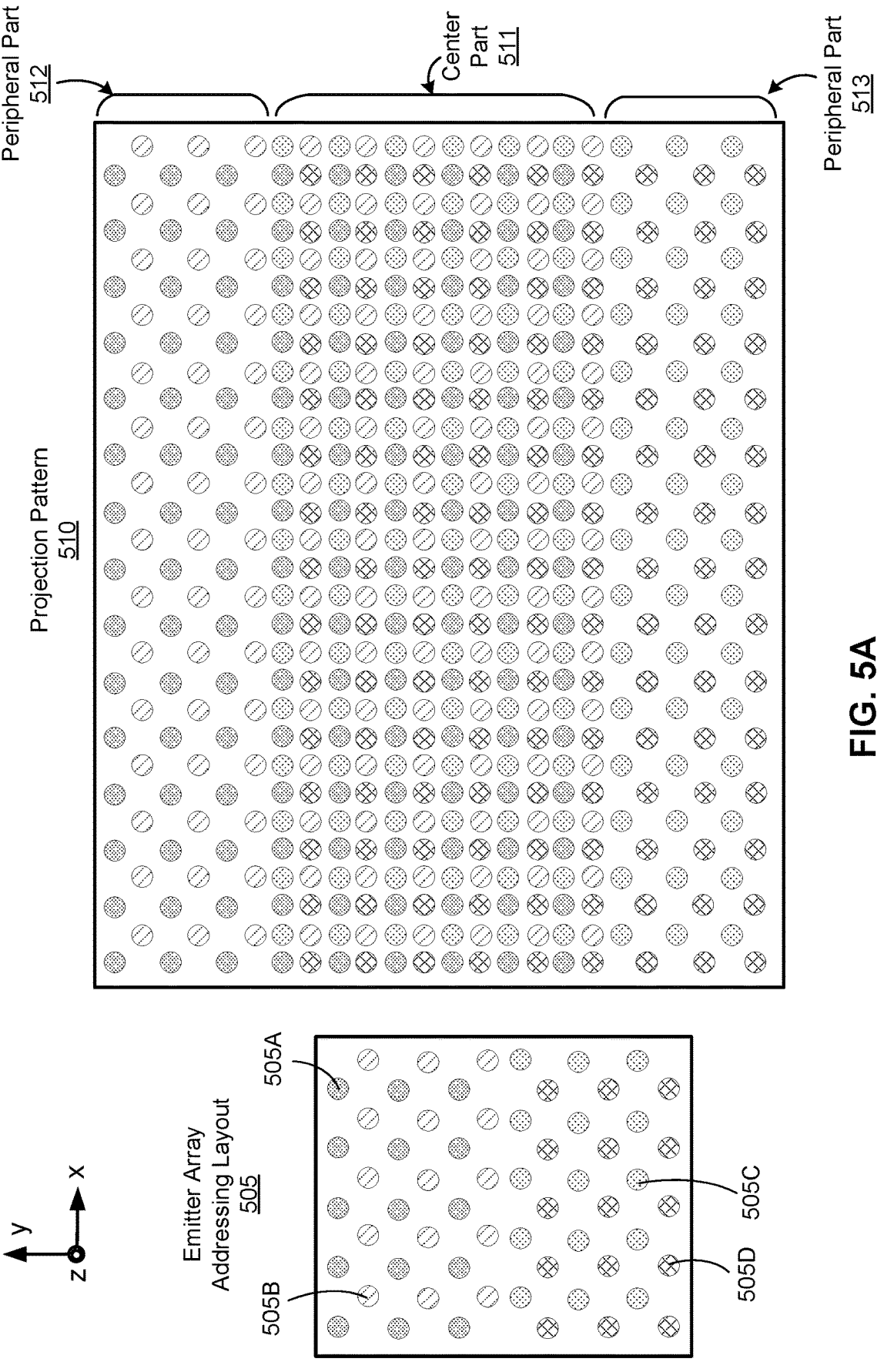
FIG. 5A illustrates a first example of an emitter array addressing layout and a corresponding projection pattern, in accordance with one or more embodiments.

FIG. 5A illustrates an example emitter array addressing layout 505 and a corresponding projection pattern 510, in accordance with one or more embodiments. The addressing layout 505 may be associated with a projector (e.g., the projector 205 or the projector 300) that includes an emitter array (e.g., a VCSEL array) and an optical assembly (e.g., the optical assembly 220) for generating the projection pattern 510. The addressing layout 505 may include four subarrays of emitters—subarray A, subarray B, subarray C, and subarray D each having, e.g., 15 emitters (or some other number of emitters in each subarray). Each subarray A, B, C, and D corresponds to a separate independently addressable channel emitting light in accordance with emission instructions. Each circle in the addressing layout 505 having a corresponding pattern fill is associated to a specific emitter (e.g., VCSEL) from one of the four independently addressable channels (or subarrays) emitting a light beam of a circular shape (i.e., dot). Thus, each circle 505A, 505B, 505C, and 505D relates to a light beam of a circular shape emitted from the respective subarray A, B, C and D. Emitters of the subarrays A and B may be intermixed, and similarly emitters of the subarrays C and D may be intermixed. All emitters of the four subarrays A, B, C and D may be placed on the same substrate. By putting the subarrays A, B, C and D on the same substrate, the complexity of addressing is substantially reduced relative to the case when the subarrays are interwoven in the emitter array.

The optical assembly of the projector having the addressing layout 505 may tile light from the four subarrays into the projection pattern 510, as shown in FIG. 5A. The projection pattern 510 may include, e.g., 540 dots, or some other number of dots (which may depend on a number of emitters in the addressing layout 505). The projection pattern 510 has an illumination density higher in a center part 511 of a FOV than at peripheral parts 512, 513 of the FOV. In some embodiments, not all of the independently addressable channels are active and emit light. For example, if at least one channel corresponding to one or more subarrays is not active, then the center part 511 would have an increased density in either x or y dimension. And if all the channels are active, the center part 511 has an increased density in both x and y dimensions, as shown in FIG. 5A.

Each circle in the projection pattern 510 having a corresponding pattern fill represents a light beam that originates from a corresponding independently addressable channel of the addressing layout 505. Note that multiple beams in the projection pattern 510 correspond to a single emitter in the addressing layout 505. In some embodiments, each circle in the projection pattern 510 may also correspond to an imaged position (i.e., pixel, memory element, or unit cell) on a detector of an imaging device (e.g., the detector 235).

Figure 5B:
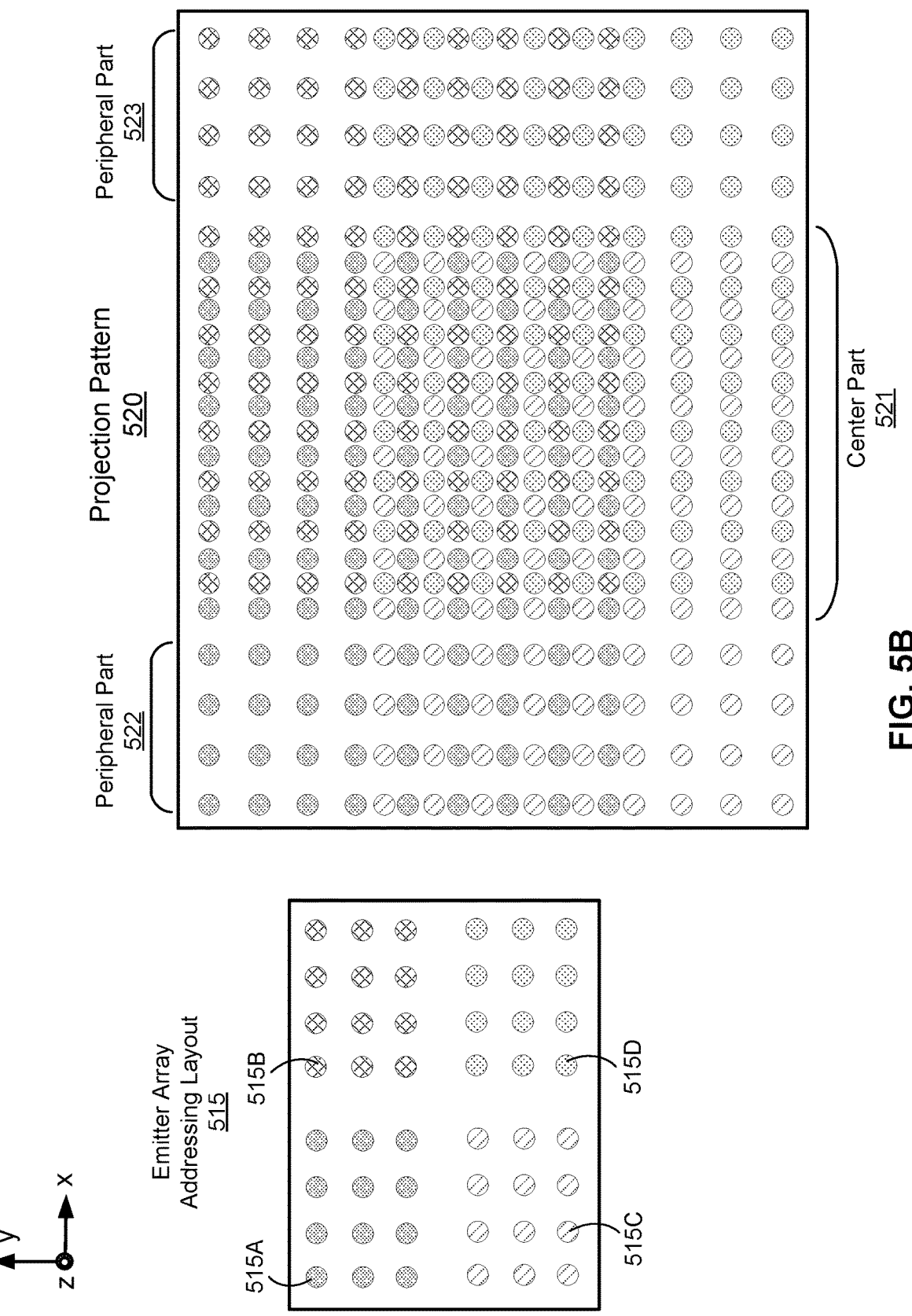
FIG. 5B illustrates a second example of an emitter array addressing layout and a corresponding projection pattern, in accordance with one or more embodiments.

FIG. 5B illustrates an example emitter array addressing layout 515 and a corresponding projection pattern 520, in accordance with one or more embodiments. The addressing layout 515 may be associated with a projector (e.g., the projector 205 or the projector 300) that includes an emitter array (e.g., a VCSEL array) and an optical assembly (e.g., the optical assembly 220) for generating the projection pattern 520. The addressing layout 515 may include four subarrays of emitters—subarray A, subarray B, subarray C, and subarray D each having, e.g., 16 emitters (or some other number of emitters in each subarray). Each subarray A, B, C, and D corresponds to a separate independently address- able channel emitting light in accordance with emission instructions. Each circle in the addressing layout 515 having a corresponding pattern fill is associated to a specific emitter (e.g., VCSEL) from one of the four independently address- able channels (or subarrays) emitting a light beam of a circular shape (i.e., dot). Thus, each circle 515A, 515B, 515C, and 515D relates to a light beam of a circular shape emitted from the respective subarray A, B, C and D. All emitters of the four subarrays A, B, C and D may be placed on the same substrate. By putting the subarrays A, B, C and D on the same substrate, the complexity of addressing is substantially reduced relative to the case when the subarrays are interwoven in the emitter array.

The optical assembly of the projector having the address- ing layout 515 may tile light from the four subarrays into the projection pattern 520, as shown in FIG. 5B. The projection pattern 520 may include, e.g., 432 dots, or some other number of dots (which may depend on a number of emitters in the addressing layout 515). The projection pattern 520 has an illumination density higher in a center part 521 of a FOV than at peripheral parts 522, 523 of the FOV. In some embodiments, not all of the independently addressable chan- nels are active and emit light. For example, if at least one channel corresponding to one or more subarrays is not active, then the center part 521 would have an increased density in either x or y dimension. And if all the channels are active, the center part 521 has an increased density in both x and y dimensions, as shown in FIG. 5B.

Each circle in the projection pattern 520 having a corre- sponding pattern fill represents a light beam that originates from a corresponding independently addressable channel of the addressing layout 515. Note that multiple beams in the projection pattern 520 correspond to a single emitter in the addressing layout 515. In some embodiments, each circle in the projection pattern 520 may also correspond to an imaged position (i.e., pixel, memory element, or unit cell) on a detector of an imaging device (e.g., the detector 235).

Figure 5C:
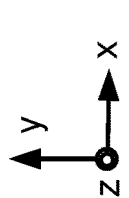
FIG. 5C illustrates a third example of an emitter array addressing layout and a corresponding projection pattern, in accordance with one or more embodiments.

FIG. 5C illustrates an example emitter array addressing layout 525 and a corresponding projection pattern 530, in accordance with one or more embodiments. The addressing layout 525 may be associated with a projector (e.g., the projector 205 or the projector 300) that includes an emitter array (e.g., a VCSEL array) and an optical assembly (e.g., the optical assembly 220) for generating the projection pattern 530. The addressing layout 525 may include four subarrays of emitters—subarray A, subarray B, subarray C, and subarray D each having, e.g., 6×8 emitters (or some other number of emitters in each subarray). Each subarray A, B, C, and D corresponds to a separate independently addressable channel emitting light in accordance with emis- sion instructions. Each circle in the addressing layout 525 having a corresponding pattern fill is associated to a specific emitter (e.g., VCSEL) from one of the four independently addressable channels (or subarrays) emitting a light beam of a circular shape (i.e., dot). Thus, each circle 525A, 525B, 525C, and 525D relates to a light beam of a circular shape emitted from the respective subarray A, B, C and D. All emitters of the four subarrays A, B, C and D may be placed on the same substrate. By putting the subarrays A, B, C and D on the same substrate, the complexity of addressing is substantially reduced relative to the case when the subarrays are interwoven in the emitter array. It can be observed that there is an offset in the addressing layout 525 between the subarray A (i.e., the first addressable channel) and the subarray B (i.e., the second addressable channel), as well as between the subarray C (e.g., the third addressable channel) and the subarray D (i.e., the fourth addressable channel). By introducing the offset along both x and y dimensions, more gradual change of an illumination density across a FOV along both x and y dimensions can be achieved, as illustrated by the projection pattern 530.

The optical assembly of the projector having the address- ing layout 515 may tile light from the four subarrays into the projection pattern 530, as shown in FIG. 5B. The projection pattern 530 may include, e.g., 1728 dots, or some other number of dots (which may depend on a number of emitters in the addressing layout 525). The projection pattern 530 has an illumination density higher in a center part of a FOV than at peripheral parts of the FOV. In some embodiments, not all of the independently addressable channels are active and emit light. For example, if at least one channel correspond- ing to one or more subarrays is not active, then the center part of the FOV would have an increased density in either x or y dimension. And if all the channels are active, the center part of the FOV has an increased density in both x and y dimensions, as shown in FIG. 5C.

Each circle in the projection pattern 530 having a corre- sponding pattern fill represents a light beam that originates from a corresponding independently addressable channel of the addressing layout 525. Note that multiple beams in the projection pattern 530 correspond to a single emitter in the addressing layout 525. In some embodiments, each circle in the projection pattern 530 may also correspond to an imaged position (i.e., pixel, memory element, or unit cell) on a detector of an imaging device (e.g., the detector 235).

FIG. 6 is a flow chart illustrating a process 600 of illuminating a target area with a light pattern emitted by an array of emitters, in accordance with one or more embodi- ments. The process 600 of FIG. 6 may be performed by a projector, e.g., the projector 120, the projector 205 and/or the projector 300. Other entities (e.g., one or more other com- ponents of a DCA or an eye tracker) may perform some or all of the steps of the process in other embodiments. Like- wise, embodiments may include different and/or additional steps, or perform the steps in different orders.

The projector receives 605 emission instructions specify- ing activation of one or more independently addressable channels in each subarray of a plurality of subarrays of an array of emitters, at least two of the subarrays being adjacent to each other and do not overlap. Each emitter of the array of emitters may be a VCSEL. The array of emitters may comprise a pair of subarrays position side by side to each other (e.g., illustrated in FIG. 4A as the addressing projector layout 405). Alternatively, the array of emitters may com- prise four subarrays positioned in a quadrant arrangement (e.g., illustrated in FIG. 4B as the addressing projector layout 415).

The projector activates 610 the specified one or more channels in each subarray based on the emission instruc- tions. The projector may control operation of each subarray by activating or deactivating each of the one or more channels in that subarray, based at least in part on the emission instructions.

The projector illuminates 615 a target area with a light pattern formed by tiling light emitted from the activated one or more channels in each subarray. The light pattern may be composed of a first plurality of sections and a second plurality of sections. Each section of the first plurality may represent a first respective portion of the light pattern emitted from a corresponding subarray. Each section of the second plurality may represent a second respective portion of the light pattern formed by tiling light emitted from two or more of the subarrays. The light pattern emitted from the array of emitters may be a dot pattern. The light pattern may have an illumination density higher in a center of the light pattern than at a periphery of the light pattern. The light pattern may be determined in part by which of the one or more channels are active in each of the subarrays. The light pattern may comprise a pattern of circular shapes, where each shape may be defined by an emission area (e.g., non-circular emission area) of a corresponding emitter within the array of emitters.

In some embodiments, the projector is part of a DCA that includes an imaging device and a controller. The imaging device captures one or more images of at least a portion of the light pattern reflected from one or more objects in the target area. The controller generates the emission instructions, provides the emission instructions to the projector, and determines depth information for the one or more objects based in part on the captured one or more images. In some embodiments, a detector of the imaging device in the DCA is instructed to activate a group of pixels (or unit cells) of the detector corresponding to the projected light pattern, and to output light signals captured by the activated group of pixels. The controller may determine the depth information for the one or more objects in the target area using the light signals captured by the activated group of pixels and output by the detector. The DCA may provide the determined depth information to a console coupled to the headset that generates content for presentation on a display of the headset, based on the depth information. Alternatively, the DCA may provide the determined depth information to a module of the headset that generates content for presentation on the display of the headset, based on the depth information.

The DCA with the projector presented herein may be integrated into a headset as part of an AR system. In this case, the headset may be configured to sense and display objects behind a head of a user wearing the headset or display objects recorded previously. Alternatively, the DCA with the projector may be integrated into a base station or a sensor bar external to the headset. In this case, the DCA may be configured to sense various body parts of a user wearing the headset or portions of an environment, e.g., for recording the geometry of a user or a local area, hand-tracking, eye-tracking, face recognition, gesture recognition, environment scanning, environment reconstruction, etc. In some embodiments, the DCA with the projector is integrated into a portable computing platform (e.g., a mobile phone or tablet).

In some other embodiments, the projector presented herein is part of an eye tracker, and the light pattern from the projector illuminates the target area that includes an eye box of a headset. An imaging device of the eye tracker captures one or more images of at least a portion of the light pattern reflected from at least one surface of an eye in the eye box. A controller of the eye tracker determines position and orientation of the eye in the eye box (e.g., gaze direction for eye) based on the captured one or more images.

System Environment

Figure 7:
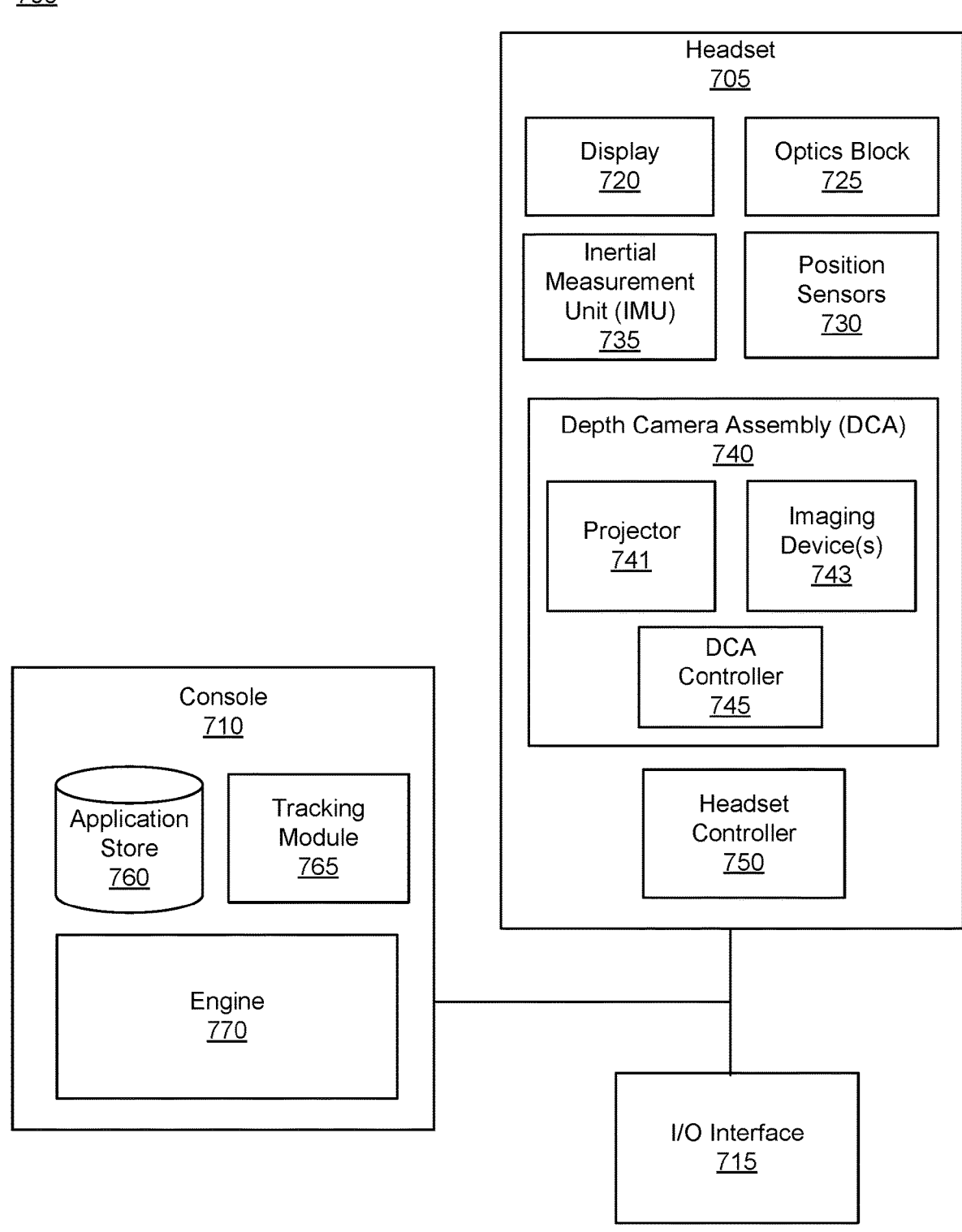
FIG. 7 is a block diagram of a system environment that includes a headset, in accordance with one or more embodiments.

FIG. 7 is a block diagram of a system environment that includes a headset, in accordance with one or more embodiments. The system 700 may operate in an artificial reality environment, e.g., a virtual reality, an augmented reality, a mixed reality environment, or some combination thereof. The system 700 shown by FIG. 7 comprises a headset 705 and an input/output (I/O) interface 715 that is coupled to a console 710. While FIG. 7 shows an example system 700 including one headset 705 and on I/O interface 715, in other embodiments any number of these components may be included in the system 700. For example, there may be multiple headsets 705 each having an associated I/O interface 715, with each headset 705 and I/O interface 715 communicating with the console 710. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 710 is provided by the headset 705.

The headset 705 is a NED or a HMD that presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the headset 705, the console 710, or both, and presents audio data based on the audio information. The headset 705 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the headset 705 is the headset 100 of FIG. 1A implemented as a NED. Another embodiment of the headset 705 is the headset 165 of FIG. 1C implemented as a HMD.

The headset 705 may include a display 720, an optics block 725, one or more position sensors 730, an IMU 735, a DCA 740, and a headset controller 750. Some embodiments of the headset 705 have different and/or additional components than those described in conjunction with FIG. 7. Additionally, the functionality provided by various components described in conjunction with FIG. 7 may be differently distributed among the components of the headset 705 in other embodiments.

The display 720 displays two-dimensional or three-dimensional images to the user in accordance with data received from the console 710. In various embodiments, the display 720 comprises a single display or multiple displays (e.g., a display for each eye of a user). Examples of the display 720 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, some other display, a scanner, one-dimensional array, or some combination thereof. Content displayed on the display 720 may include the depth information determined by the DCA 740. An embodiment of the display 720 is the display assembly 140.

The optics block 725 magnifies image light received from the display 720, corrects optical errors associated with the image light, and presents the corrected image light to a user of the headset 705. In various embodiments, the optics block 725 includes one or more optical elements. Example optical elements included in the optics block 725 include: an aperture, a Fresnel lens, a convex lens, a concave lens, a filter, a reflecting surface, or any other suitable optical element that affects image light. Moreover, the optics block 725 may include combinations of different optical elements. In some embodiments, one or more of the optical elements in the optics block 725 may have one or more coatings, such as partially reflective or anti-reflective coatings.

Magnification and focusing of the image light by the optics block 725 allows the display 720 to be physically smaller, weigh less, and consume less power than larger displays. Additionally, magnification may increase the field of view of the content presented by the display 720. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 725 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 725 corrects the distortion when it receives image light from the electronic display generated based on the content.

The IMU 735 is an electronic device that generates data indicating a position of the headset 705 based on measurement signals received from one or more of the position sensors 730. A position sensor 730 generates one or more measurement signals in response to motion of the headset 705. Examples of position sensors 730 include: one or more accelerometers, one or more gyroscopes, one or more magnetometers, another suitable type of sensor that detects motion, a type of sensor used for error correction of the IMU 735, or some combination thereof. The position sensors 730 may be located external to the IMU 735, internal to the IMU 735, or some combination thereof. An embodiment of the position sensor 735 is the position sensor 130.

The DCA 740 includes a projector 741, one or more imaging devices 743 and a DCA controller 745. The DCA 740 generates depth image data of a local area surrounding some or all of the headset 705. Depth image data includes pixel values defining distance from the imaging device, and thus provides a (e.g., 3D) mapping of locations captured in the depth image data. An embodiment of the DCA 740 is the DCA 145, an embodiment of the projector 741 is the projector 120, an embodiment of the imaging device 743 is the imaging device 115, and an embodiment of the DCA controller 745 is the DCA controller 160.

In some embodiments, the DCA 740 generates depth image data using the structured light depth sensing technique. The DCA 740 may emit structured light and determine depth information for the local area by capturing reflected and deformed structured light pattern. In some other embodiments, the DCA 740 generates depth image data using the time-of-flight depth sensing technique. The DCA 740 may generate the depth image data based on time required to light to be emitted from the projector 741 until at least a portion of the light reflected from one or more objects in the local area is captured by the one or more imaging devices 743. In some other embodiments, the DCA 740 generates depth image data using active or passive stereo imaging. By comparing information about a local area from two vantage points, the DCA 740 may extract depth information based on relative positions of objects in two panels.

The projector 741 may be configured to illuminate a target area (e.g., at least a portion of the local area) with a light pattern in accordance with emission instructions generated by the DCA controller 745. The projector 741 may include an array of emitters having a plurality of subarrays. Each subarray of the projector 741 may include one or more independently addressable channels emitting light in accordance with emission instructions, and at least two of the subarrays may be adjacent to each other and do not overlap. At least the portion of the emitters in the array of the projector 741 may emit light in the NIR spectrum. Each emitter in the array of emitters in the projector 741 may be implemented as a VCSEL emitter that emits in, e.g., the NTR spectrum. The light emitted from the array of emitters of the projector 741 may be projected into the target area as a light pattern by an optical assembly of the projector 741. The optical assembly of the projector 741 may be implemented as a diffractive beam splitting optical element, a collimation optical element, one or more projection lenses, some other type of optical elements, or some combination thereof. The optical assembly of the projector 741 may tile portions of the emitted light to form the light pattern for projection to the target area. The light pattern emitted by the projector 741 may be composed of a first plurality of sections and a second plurality of sections, each section of the first plurality representing a first respective portion of the light pattern emitted from a corresponding subarray, and each section of the second plurality representing a second respective portion of the light pattern formed by tiling light emitted from two or more of the subarrays. The projector 741 may be an embodiment of the projector 120, an embodiment of the projector 205, or an embodiment of the projector 300.

In some embodiments, the same type of the projector as the projector 741 can be part of an eye tracker integrated into a headset 705 (not shown in FIG. 7) that illuminates one of more surfaces of an eye located in an eye box of the headset 705. The eye tracker may capture light reflected from the one of more eye surfaces and determine a gaze direction for the eye based on the captured light.

The DCA controller 745 may generate emission instructions and provide the emission instructions to the projector 741 to control operation of at least a portion of the emitters in the projector 741. The DCA controller 745 may control operation of at least the portion of emitters in the projector 741 by activating (or deactivating) the one or more channels in each subarray based on the emission instructions. The DCA controller 745 may further generate the depth image data based on light captured by the one or more imaging devices 743 by using structed light depth sensing techniques, time-of-flight depth sensing techniques, stereo based depth sensing techniques, some other depth sensing technique, or combination thereof. The DCA controller 745 may provide the depth image data to the console 710, the headset controller 750, or some other component. In some embodiments, the DCA controller 745 controls operation of one or more emitters in the projector 741, based at least in part on the depth image data.

The I/O interface 715 is a device that allows a user to send action requests and receive responses from the console 710. An action request is a request to perform a particular action. For example, an action request may be an instruction to start or end capture of image or video data or an instruction to perform a particular action within an application. The I/O interface 715 may include one or more input devices. Example input devices include: a keyboard, a mouse, a game controller, or any other suitable device for receiving action requests and communicating the action requests to the console 710. An action request received by the I/O interface 715 is communicated to the console 710, which performs an action corresponding to the action request. In some embodiments, the I/O interface 715 includes an IMU 735 that captures calibration data indicating an estimated position of the I/O interface 715 relative to an initial position of the I/O interface 715. In some embodiments, the I/O interface 715 may provide haptic feedback to the user in accordance with instructions received from the console 710. For example, haptic feedback is provided when an action request is received, or the console 710 communicates instructions to the I/O interface 715 causing the I/O interface 715 to generate haptic feedback when the console 710 performs an action.

The console 710 provides content to the headset 705 for processing in accordance with information received from one or more of: the DCA 740, the headset controller 750, and the I/O interface 715. In the example shown in FIG. 7, the console 710 includes an application store 760, a tracking module 765, and an engine 770. Some embodiments of the console 710 have different modules or components than those described in conjunction with FIG. 7. Similarly, the functions further described below may be distributed among components of the console 710 in a different manner than described in conjunction with FIG. 7.

The application store 760 stores one or more applications for execution by the console 710. An application is a group of instructions, that when executed by a processor, generates content for presentation to the user. Content generated by an application may be in response to inputs received from the user via movement of the headset 705 or the I/O interface 715. Examples of applications include: gaming applications, conferencing applications, video playback applications, or other suitable applications.

The tracking module 765 calibrates the system 700 using one or more calibration parameters and may adjust one or more calibration parameters to reduce error in determination of the position of the headset 705 or of the I/O interface 715. For example, the tracking module 765 communicates a calibration parameter to the DCA 740 to adjust the focus of the DCA 740 to more accurately determine positions of structured light elements captured by the DCA 740. Calibration performed by the tracking module 765 also accounts for information received from the IMU 735 in the headset 705 and/or an IMU included in the I/O interface 715. Additionally, if tracking of the headset 705 is lost (e.g., the DCA 740 loses line of sight of at least a threshold number of structured light elements), the tracking module 765 may re-calibrate some or all of the system 700.

The tracking module 765 tracks movements of the headset 705 or of the I/O interface 715 using information from the DCA 740, the one or more position sensors 730, the IMU 735, or some combination thereof. For example, the tracking module 765 determines a position of a reference point of the headset 705 in a mapping of a local area based on information from the headset 705. The tracking module 765 may also determine positions of the reference point of the headset 705 or a reference point of the I/O interface 715 using data indicating a position of the headset 705 from the IMU 735 or using data indicating a position of the I/O interface 715 from an IMU 735 included in the I/O interface 715, respectively. Additionally, in some embodiments, the tracking module 765 may use portions of data indicating a position or the headset 705 from the IMU 725 as well as representations of the local area from the DCA 740 to predict a future location of the headset 705. The tracking module 765 provides the estimated or predicted future position of the headset 705 or the I/O interface 715 to the engine 770.

The engine 770 generates a three-dimensional mapping of the area surrounding the headset 705 (i.e., the "local area") based on information received from the headset 705. In some embodiments, the engine 770 determines depth information for the three-dimensional mapping of the local area based on information received from the DCA 740 that is relevant for techniques used in computing depth. The engine 770 may calculate depth information using one or more techniques in computing depth from the portion of the reflected light detected by the DCA 740, such as the stereo based techniques, the structured light illumination techniques, and the time-of-flight techniques. In various embodiments, the engine 770 uses the depth information to, e.g., update a model of the local area, and generate content based in part on the updated model.

The engine 770 also executes applications within the system 700 and receives position information, acceleration information, velocity information, predicted future positions, or some combination thereof, of the headset 705 from the tracking module 765. Based on the received information, the engine 770 determines content to provide to the headset 705 for presentation to the user. For example, if the received information indicates that the user has looked to the left, the engine 770 generates content for the headset 705 that mirrors the user's movement in a virtual environment or in an environment augmenting the local area with additional content. Additionally, the engine 770 performs an action within an application executing on the console 710 in response to an action request received from the I/O interface 715 and provides feedback to the user that the action was performed. The provided feedback may be visual or audible feedback via the headset 705 or haptic feedback via the I/O interface 715.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A projector comprising:
an array of emitters having a plurality of subarrays, each subarray includes one or more independently address-able channels emitting light in accordance with emission instructions, and at least two of the subarrays are adjacent to each other and do not overlap; and
an optical assembly configured to tile portions of the emitted light to form a light pattern for projection to a target area, the light pattern having;
a first peripheral part that includes first dots emitted by first emitters of a first subarray in the plurality of subarrays;
a second peripheral part that includes second dots emitted by second emitters of a second subarray in the plurality of subarrays; and
a center part including a plurality of rows of the first dots and the second dots, the center part disposed between the first peripheral part and the second peripheral part and having a higher illumination density than the first peripheral part and the second peripheral part.

2. The projector of claim 1, wherein the light pattern comprises a pattern of circular shapes, where each shape is defined by an emission area of a corresponding emitter within the array of emitters.

3. The projector of claim 2, wherein the emission area comprises a non-circular emission area.

4. The projector of claim 1, wherein the projector further comprises a controller configured to:
control operation of each subarray by activating or deactivating each of the one or more channels in that subarray, based at least in part on the emission instructions.

5. The projector of claim 1, wherein the optical assembly comprises at least one of a diffractive optical element configured for beam splitting, and collimation optics.

6. The projector of claim 1, wherein the projector is part of a depth camera assembly comprising:
an imaging device configured to capture one or more images of at least a portion of the light pattern reflected from one or more objects in the target area; and
a controller configured to:
generate the emission instructions,
provide the emission instructions to the projector, and
determine depth information for the one or more objects based in part on the captured one or more images.

7. The projector of claim 6, wherein the imaging device includes a detector comprising an array of a pixels, and the controller is configured to activate at least a portion of the pixels in accordance with the light pattern.

8. The projector of claim 1, wherein the array of emitters comprises a pair of subarrays position side by side to each other.

9. The projector of claim 1, wherein the array of emitters comprises four subarrays positioned in a quadrant arrangement.

10. The projector of claim 1, wherein the projector is part of a headset and the light pattern from the projector illuminates the target area that includes a local area surrounding at least a portion of the headset.

11. The projector of claim 1, wherein the projector is part of an eye tracker and the light pattern from the projector illuminates the target area that includes an eye box of a headset.

12. The headset of claim 1, wherein the center part of the tiled light pattern has increased density in a y dimension but not a x dimension.

13. The headset of claim 1, wherein the center part of the tiled light pattern includes the first dots interspersed with the second dots.

14. A method comprising:
receiving emission instructions specifying activation of one or more independently addressable channels in each subarray of a plurality of subarrays of an array of emitters, at least two of the subarrays are adjacent to each other and do not overlap;
activating the specified one or more channels in each subarray based on the emission instructions; and
illuminating a target area with a light pattern formed by tiling light emitted from the activated one or more channels in each subarray,
the light pattern having;
a first peripheral part that includes first dots emitted by first emitters of a first subarray in the plurality of subarrays;
a second peripheral part that includes second dots emitted by second emitters of a second subarray in the plurality of subarrays; and
a center part including a plurality of rows the first dots and the second dots, the center part disposed between the first peripheral part and the second peripheral part and having a higher illumination density than the first peripheral part and the second peripheral part.

15. The method of claim 14, further comprising:

capturing one or more images of at least a portion of the light pattern reflected from one or more objects in the target area; and determining depth information for the one or more objects based in part on the captured one or more images.

16. A headset comprising:

a first subarray of first emitters configured to emit first light;

a second subarray of second emitters configured to emit second light, wherein the first subarray is independently addressable from the second subarray, and wherein the first subarray disposed adjacent to the second subarray;

an optical assembly configured to generate a tiled light pattern from the first light and the second light, wherein the tiled light pattern includes:

a first peripheral part that includes first dots of the first light emitted by the first emitters;

a second peripheral part that includes second dots of the second light emitted by the second emitters; and a center part including a plurality of rows first dots and second dots, the center part disposed between the first peripheral part and the second peripheral part and having a higher illumination density than the first peripheral part and the second peripheral part.

17. The headset of claim 16 further comprising:

a detector having a pixel array, wherein each of the first dots and the second dots in the tiled light pattern correspond to a pixel in the pixel array of the detector.

18. The headset of claim 16, wherein the optical assembly includes a diffractive optical element (DOE) beam splitter.

19. The headset of claim 16, wherein the center part of the tiled light pattern has increased density in an x dimension but not a y dimension.

20. The headset of claim 16, wherein the center part of the tiled light pattern includes the first dots interspersed with the second dots.

* * * * *